(12) United States Patent
Stensgaard

(10) Patent No.: US 10,955,049 B2
(45) Date of Patent: Mar. 23, 2021

(54) DUAL-MASS FLYWHEEL CONCEPT FOR INTERNAL COMBUSTION ENGINES

(71) Applicant: Per Stensgaard Innovasjon AS, Oslo (NO)

(72) Inventor: Per Stensgaard, Asgaardstrand (NO)

(73) Assignee: Per Stensgaard Innovasjon AS, Oslo (NO)

( * ) Notice: Subject to any disclaimer, the term of this patent is extended or adjusted under 35 U.S.C. 154(b) by 298 days.

(21) Appl. No.: 15/776,382

(22) PCT Filed: Nov. 16, 2016

(86) PCT No.: PCT/NO2016/050232
§ 371 (c)(1),
(2) Date: May 15, 2018

(87) PCT Pub. No.: WO2017/086803
PCT Pub. Date: May 26, 2017

(65) Prior Publication Data
US 2020/0256458 A1    Aug. 13, 2020

(30) Foreign Application Priority Data

Nov. 16, 2015 (NO) .................................. 20151566

(51) Int. Cl.
*F16H 61/04* (2006.01)
*B60K 6/24* (2007.10)
(Continued)

(52) U.S. Cl.
CPC .............. *F16H 61/04* (2013.01); *B60K 6/24* (2013.01); *B60K 6/26* (2013.01); *B60K 6/36* (2013.01);
(Continued)

(58) Field of Classification Search
CPC ... F16H 61/04; F16H 2061/0429; B60K 6/24; B60K 6/26; B60K 6/30; B60K 6/36; B60K 6/38; F15F 15/30
See application file for complete search history.

(56) References Cited

U.S. PATENT DOCUMENTS 6,116,364 A * 9/2000 Taguchi .................. B60K 6/405
                                                              180/65.26
6,424,126 B1 * 7/2002 Ohsawa .................... B60K 6/24
                                                              180/65.1
(Continued)

FOREIGN PATENT DOCUMENTS

EP    0412683 A    2/1992
EP    2749790 A2   7/2014
(Continued)

OTHER PUBLICATIONS

International Search Report and Written Opinion in International Application No. PCT/NO2016/050232, dated Aug. 3, 2017 (12 pages).

(Continued)

*Primary Examiner* — Huan Le
(74) *Attorney, Agent, or Firm* — Nixon Peabody LLP

(57) ABSTRACT

Dual-mass flywheel concept for internal combustion engines, where the secondary flywheel can be disconnected and reconnected as required, by means of a clutch. The concept is characterized in that it comprises a primary flywheel fixedly mounted on the engine crankshaft, a secondary flywheel which is stored so that it can rotate freely, a clutch connecting the secondary flywheel to the drive shaft (input shaft on the gearbox), an elastic element (springs) which connects the primary flywheel to the drive shaft.

11 Claims, 1 Drawing Sheet

(51) Int. Cl.
     *B60K 6/26*          (2007.10)
     *B60K 6/36*          (2007.10)
     *B60K 6/38*          (2007.10)
     *F16F 15/30*        (2006.01)

(52) U.S. Cl.
     CPC ............... *B60K 6/38* (2013.01); *F16F 15/30* (2013.01); *F16H 2061/0429* (2013.01)

(56) References Cited

U.S. PATENT DOCUMENTS

| | | |
|---|---|---|
| 2009/0020354 A1 | 1/2009 | Roth |
| 2010/0184549 A1 | 7/2010 | Sartre |
| 2011/0088507 A1* | 4/2011 | Fields ................... H02K 7/025 74/572.1 |
| 2014/0046538 A1* | 2/2014 | Siegel ................... B60K 6/105 701/36 |
| 2014/0106927 A1 | 4/2014 | Gibson |
| 2014/0231165 A1 | 8/2014 | Hori |

FOREIGN PATENT DOCUMENTS

| | | | |
|---|---|---|---|
| FR | | 2705749 A1 | 12/1994 |
| GB | | 2153929 A | 8/1985 |
| WO | WO 2004/076878 A2 | | 9/2004 |
| WO | WO 2007/043875 A1 | | 4/2007 |

OTHER PUBLICATIONS

Norwegian Search Report in Norwegian Patent Application No. 20151566, dated Jun. 16, 2016 (2 pages).

\* cited by examiner

DUAL-MASS FLYWHEEL CONCEPT FOR INTERNAL COMBUSTION ENGINES

CROSS-REFERENCE TO RELATED APPLICATIONS

This application is a U.S. National Stage of International Application No. PCT/NO2016/050232, filed Nov. 16, 2016, which claims priority to and the benefit of Norwegian Application No. 20151566, filed Nov. 16, 2015, which is incorporated by reference in its entirety.

TECHNICAL FIELD

The present invention regards a system and method for changing gear in a manual transmission in a vehicle, more specifically a system and method for automated gear change for a traditional manual gearbox.

BACKGROUND OF THE INVENTION

The development of transmissions is currently driven by a demand for lower fuel consumption and reduced $CO_2$ emissions. There are therefore considerable resources used on developing a new and better solution and development of automatic transmissions are part of this solution.

The main trend in automatic transmissions in recent years has been toward 2-clutch gearboxes, often termed DCT (Dual Clutch Transmission). The disadvantage with a 2-clutch transmission is that the comparison with a traditional manual transmission becomes more expensive, heavier and larger. This has meant that it has again become an increased focus on automated manual gearboxes, called AMT (Automated Manual Transmission) solutions.

With an AMT solution, you try to automate a traditional manual gearbox, and thereby retain the manual gearbox virtues.

This is done often by automated operation of the clutch.

The challenge is however to obtain sufficient rapid gear changes. Within this field, it appears that 0.1 seconds per gearshift is the norm for a "seamless" gearshift. However, a shift of gears in a manual transmission takes from 0.5-1 second.

In addition to AMT solutions it is also continuous work with variable transmissions, often termed CVT (Continuously Variable Transmission). These have pr. today a small share of the market.

An alternative to achieving a desired AMT solution is to make use of the two flywheels of a dual-mass flywheel in a new way. A dual-mass flywheel, often called DMFW (Dual Mass FlyWheel), a rotary mechanical device used to provide continuous rotating energy in systems in which energy is not continuous.

A dual-mass flywheel, which is used in most cars today, comprises two flywheels and an elastic element (spring). These are built into a single unit.

The first flywheel, the primary flywheel, is attached to the engine crankshaft. The second flywheel, secondary flywheel is coupled to the first flywheel via the elastic element (and clutch is mounted on the secondary flywheel).

The elastic element allows the flywheels to rotate a considerable angle, approximately 60° to each other. This leads to a low-pass filter between the motor and gearbox. This smooths out the combustion engine uneven walk, which in turn means less noise and vibrations in the vehicle and reduced load on the powertrain.

With a dual-mass flywheel, the engine can be used at lower revolutions. This results in a lower consumption of fuel and less $CO_2$ emissions.

Dual-mass flywheel has its mission primarily at low revolutions.

SUMMARY OF THE INVENTION

It is an object of the present invention to provide a gearshift concept where a traditional manual gearbox can be shifted rapidly, estimated down to 0.1 seconds, without using a clutch for breaking the connection between engine and transmission, and without inflicting vehicle unacceptable jerk/vibration during shifting.

This is achieved with a concept as defined in the appended claims.

Users enjoy benefits such as reduced inertia at medium to high revolutions, greater inertia at low revolutions, the ability to start/stop function and the possibility of hybridization.

The present invention uses the same components as used in a dual-mass flywheel—two flywheels and an elastic member (springs)—as well as a clutch and two electric motors/generators. The clutches task here is to connect the secondary flywheel to the drive shaft, not to transfer engine torque to the transmission.

Electric motors/generators are not strictly necessary for the concept, but without these one loses functions as start/stop and the possibility of hybridization, and the clutch will be subjected to significantly greater wear.

The concept allows the use of a clutch in a traditional manner, for example for start-up or whether other reasons are desirable to disengage the engine from the transmission.

The gearbox can be operated manually or automatically.

DETAILED DESCRIPTION

Figure 1:
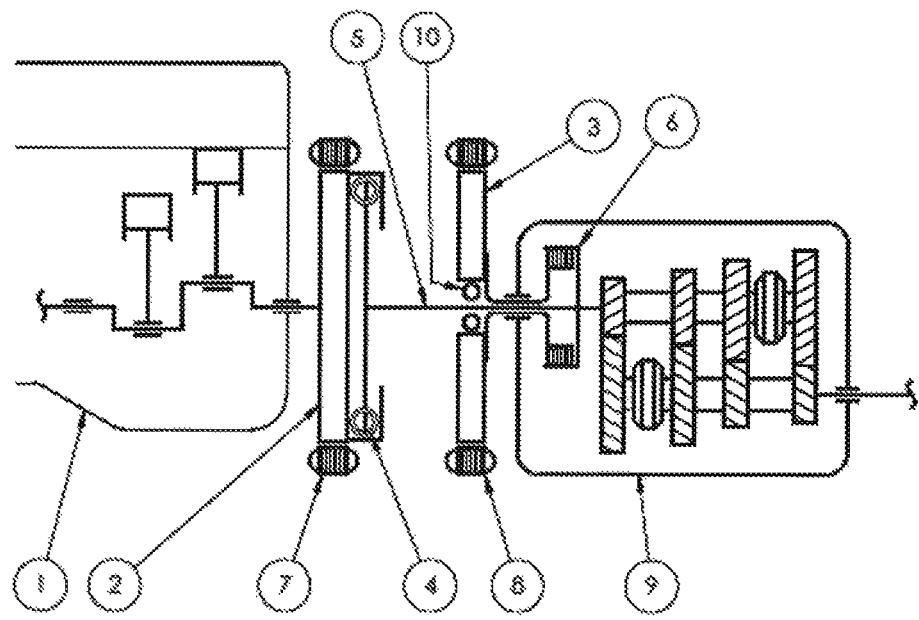
FIG. 1 is a schematic diagram showing a preferred embodiment of the invention, where one has a dual-mass flywheel solution without a clutch between the engine and the transmission.

FIG. 1 is a schematic diagram showing a preferred embodiment of the invention where one has a dual-mass flywheel solution without a clutch between the engine and the transmission.

There are mainly the same components as in a traditional dual-mass flywheel solution, i.e. two flywheels and an elastic element, in the form of springs, and a clutch, but the components are configured in a new way, in addition to two electric motors/generators are connected to respective flywheel. The two electric motors/generators designated hereinafter EMG 1 and EMG 2.

On the far left is the internal combustion engine 1. A crankshaft comes out from the internal combustion engine 1. The primary flywheel 2 is fixed on the combustion engine's crankshaft. The primary flywheel is then connected to the drive shaft 5 via an elastic element (4). The drive shaft 5 is the input shaft of the gearbox 9.

Before the gearbox 9 is the secondary flywheel 3. The secondary flywheel 3 is bedded. This bedding may preferably be a ball bearing 10. The bedding results in the secondary flywheel being able to rotate freely.

A clutch 6 serves the purpose of connecting and disconnecting the secondary flywheel to and from the drive shaft. It may be a wet clutch plased within the gearbox 9, or a dry-plate clutch located outside the gearbox (the secondary flywheel).

Two electric motors/generators (EMG 1) 7 and (EMG 2) 8, are connected to the flywheels.

EMG 1 is connected to the primary flywheel. EMG 2 is connected to the secondary flywheel.

In an alternative solution EMG 1 may be connected to the engine crankshaft.

At low engine revolutions, up to an estimated 1.5-4 times the engine idling speed, the secondary flywheel will be connected. In this mode, the concept has the same properties as a dual-mass flywheel.

At higher speeds, over approximately 1.5-4 times the engine idling speed, the secondary flywheel is disengaged. The speed of the secondary flywheel is controlled electrically. This means that it is kept at a rate that is appropriate for the next gear shifting by using EMG 2, when the flywheel is disengaged.

In a setup without electric motors/generators, the secondary flywheel speed is controlled with the clutch and possibly a brake.

In the present invention, the flywheels constitute the bulk of the transmission's inertia. Axles, clutches, gears etc. helps, but this contribution is small compared to the moment of inertia of the flywheel.

At medium to high engine revolutions, the secondary flywheel is disengaged.

At a gearshift the force from the engine is cut, the transmission is set in neutral and the crankshaft and the primary flywheel adapts the speed for the next change.

This means that the primary flywheel is either braked or accelerated sharply to get the right speed for the next interchange and the next gear can be entered.

While the crankshaft and the primary flywheel is decelerated or accelerated, the secondary flywheel is equivalently accelerated and decelerated. This means that if the primary flywheel is decelerated, then the secondary flywheel is accelerated. If the primary flywheel is accelerated, then the secondary flywheel is decelerated. This is done by means of the electric motors/generators and/or clutch.

by the flywheels working against each other—torque is applied to the primary flywheel, while the secondary flywheel has applied an equal, oppositely directed, torque. This means that the spin is not changed. (Spin=drive torque (angular momentum, spin, momentum torque, rotation quantity): $L=I\cdot\omega$)

Accordingly, the vehicle suffers no torque as a result of acceleration/braking of the flywheels. Torque as a result of acceleration/braking of the flywheels would result in jerks or vibrations in the vehicle. If gear shifting occurs sufficiently rapidly, down to 0.1 second, the shifting is perceived as seamlessly, i.e. without torque interruption.

At low speeds the secondary flywheel is connected. This provides a relatively large moment of inertia and dual-mass flywheel advantages. Both of which contribute to a smooth and vibration-free operation.

At higher speeds the secondary flywheel is disengaged. This provides a smaller moment of inertia and thus a more responsive engine.

Quick and imperceptible starting of the internal combustion engine can be achieved in that the secondary flywheel is disengaged and kept in motion when the internal combustion engine is stopped. The energy at startup is taken from the secondary flywheel using EMG 2 or a clutch. Quick start of the engine can thus take place without change of spin, and hence unnoticed in the form of jerks or vibrations in the vehicle.

A modern car is equipped with electric motors connected to the wheels or drive for regeneration of braking energy. These motors can be used for staring up. At sufficient speed the car can be put into gear.

One can also imagine that the vehicle is stopped with the engine in gear, and the vehicle is set in motion with the help of electric motors/generators.

The gearbox can be out of synch. This provides a smaller and lighter gearbox.

The present invention also provides for varying degrees of hybridization.

Electrical motors/generators can compensate for turbolag, and thus allow for a simpler and less expensive turbo event.

Electrical motors/generators will contribute to cost and weight.

Figure 2:
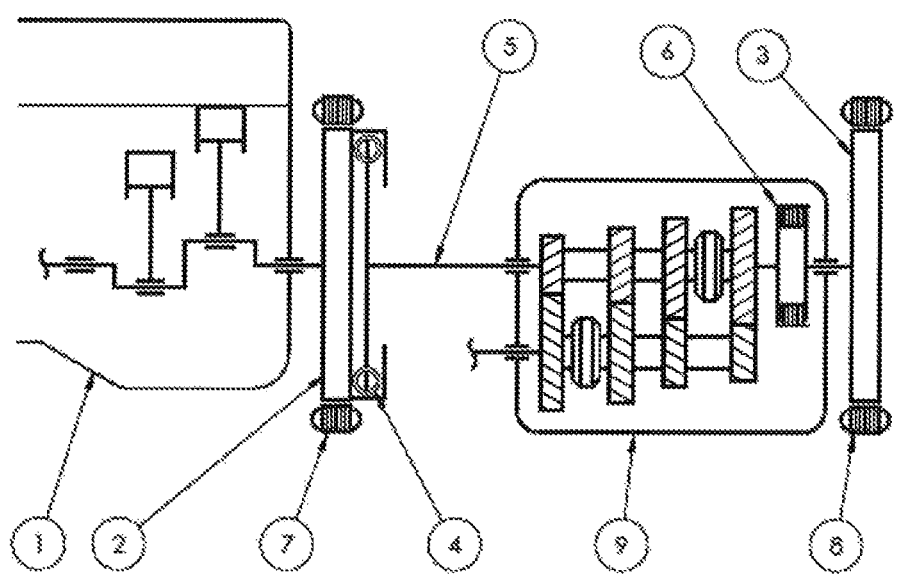
FIG. 2 shows another preferred embodiment of the invention, wherein essentially the same configuration as in FIG. 1, but with the secondary flywheel connected to the other end of the drive shaft via the clutch.

FIG. 2 shows essentially the same configuration as shown in FIG. 1. The difference here is that the secondary flywheel is connected to the other end of the drive shaft via the clutch.

On the far left is the internal combustion engine 1. From the internal combustion engine 1 comes a crankshaft. The primary flywheel 2 is fixed on the combustion engine's crankshaft. The primary flywheel is then connected to the drive shaft 5 via an elastic element (4). The drive shaft 5 is the input shaft of the gearbox 9.

On other side of the gearbox 9 is the secondary flywheel 3. A clutch 6 serves to connect the secondary flywheel to and from the drive shaft.

Two electric motor/generators (EMG 1) 7 and (EMG 2) 8, is connected to the flywheels.

EMG 1 is connected to the primary flywheel. EMG 2 is connected to the secondary flywheel.

The invention claimed is:

1. A system for automated gear shifting of a manual transmission comprising, an internal combustion engine having an idle speed, a primary flywheel mounted on a crankshaft, a drive shaft elastically coupled to the primary flywheel, a secondary flywheel, and a clutch for connecting the secondary flywheel to the drive shaft, and
    wherein a first electric motor/generator is connected to the primary flywheel and a second electric motor/generator is connected to the secondary flywheel, and
    wherein in response to a speed of the internal combustion engine being in the range of 1.5 to 4 times greater than the idle speed, the secondary flywheel being disengaged from the drive shaft.

2. The system according to claim 1 wherein the secondary flywheel is connected to the driveshaft before a gearbox and can be disengaged from the drive shaft by a bearing and the clutch.

3. The system according to claim 1 wherein the secondary flywheel is located on an opposite side of a gearbox in relation to the internal combustion engine, the secondary flywheel is connected to the drive shaft and can be released by the clutch.

4. The system according to claim 1 wherein the first electric motor/generator is connected to the crankshaft.

5. The system according to claim 1, further including a gearbox, the gearbox is a two-clutch transmission.

6. The system according to claim 1 wherein a speed of secondary flywheel speed is controlled by at least one of the clutch and a brake.

7. A method for automated gear shifting of a manual transmission having an internal combustion engine having an idle engine revolution speed, a primary flywheel mounted on a crankshaft, an elastic member for connecting the primary flywheel to a drive shaft, a second flywheel, a clutch for connecting the secondary flywheel to the drive shaft, a first electric motor connected to the primary flywheel, and a second electric motor connected to the secondary flywheel, the method comprising:

operating the internal combustion engine with the secondary flywheel engaged to the driveshaft in response to an engine revolution speed being below a specified engine revolution speed, the specified engine revolution speed being in the range of 1.5 to 4.0 times the idle engine revolution speed; and in response to the engine revolution speed exceeding the specified engine revolution speed, disengaging the secondary flywheel from the driveshaft.

8. The method according to claim 7, wherein in response to the gearshift of a gearbox being set to neutral, braking one of the first and second flywheels and accelerating the other of the first and second flywheels by use of at least one of the first electric motor, the second electric motor, and the clutch until the internal combustion engine has an appropriate speed for engaging a next gear.

9. The method according to claim 7, further including disengaging the secondary flywheel and keeping the second flywheel in motion in response to the internal combustion engine being stopped so as to permit a rapid stop-start function for the internal combustion engine.

10. The method according to claim 9, further including, in response to the combustion engine being started after stopping, decelerating the secondary flywheel while accelerating the primary flywheel.

11. The method according to claim 7, further including, in response to the combustion engine being started, decelerating the secondary flywheel while accelerating the primary flywheel.

* * * * *